(12) United States Patent
Crane et al.

(10) Patent No.: US 6,323,585 B1
(45) Date of Patent: Nov. 27, 2001

(54) ULTRAVIOLET ABSORBING AND YELLOW LIGHT FILTERING GLASSES FOR LAMP ENVELOPES

(75) Inventors: Richard H. Crane, Elmira Heights; Laura O. De Angelis; William L. Haynes, both of Painted Post; Ronald L. Stewart, Big Flats, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/303,955

(22) Filed: May 3, 1999

Related U.S. Application Data
(60) Provisional application No. 60/106,574, filed on Nov. 2, 1998.

(51) Int. Cl.[7] .............................. H01K 1/26; H01K 1/28
(52) U.S. Cl. .................... 313/112; 313/636; 313/580; 362/293; 501/64
(58) Field of Search .................... 313/112, 110, 313/578, 579, 580, 636; 362/293; 501/54, 64

(56) References Cited

U.S. PATENT DOCUMENTS

| | | | |
|---|---|---|---|
| 2,106,744 | 2/1938 | Hood et al. | 106/36.1 |
| 3,865,747 | 2/1975 | Greenburg | 252/301.1 |
| 3,929,440 | 12/1975 | Oldfield | 65/32 |
| 4,315,186 | 2/1982 | Hirano et al. | 313/111 |
| 4,376,829 | 3/1983 | Daiku | 501/64 |
| 4,390,637 | 6/1983 | Daiku | 501/64 |
| 4,454,446 | 6/1984 | Kobayashi | 313/480 |
| 4,521,524 | 6/1985 | Yamashita | 501/64 |
| 5,077,240 | 12/1991 | Hayden et al. | 501/67 |
| 5,548,491 | 8/1996 | Karpen | 362/61 |
| 6,074,969 | * 6/2000 | Naumann et al. | 501/64 |

OTHER PUBLICATIONS

Weyl, Woldemar A, Coloured Glasses, published by Society of Glass Technology, "Thorton", 20 Hallam Gate Road, Sheffield, S10 5BT, England, 1951, pp. 218–234 (no month).

S. Stroud, J.S., "Color Centers In A Cerium–Containing Silicate Glass", J. Chem. Phys., 37, No. No. 4, Aug. 1962, pp. 836–841.

* cited by examiner

*Primary Examiner*—Michael H. Day
(74) *Attorney, Agent, or Firm*—Anca C. Gheorghiu; Vincent T. Kung

(57) ABSTRACT

The present invention is directed at a family of glasses capable of absorbing UV radiation and filtering yellow light in the visible region of the spectrum, the family of glasses having a composition consisting essentially, in terms of weight percent on the oxide basis, of: 55–95.7% $SiO_2$, 0–28% $B_2O_3$, 0.5–18% $Al_2O_3$, 0–4% SrO, 0–13% BaO, 0–13% CaO, 0–8% MgO, 0–7.5% $Na_2O$, 0–9.5% $K_2O$, 0–1.5% $Li_2O$, 0–1.5% $Sb_2O_3$, 0.4–4.5% $Nd_2O_3$, and 0.1–1% $CeO_2$. Glasses of the present invention are capable of employment as envelopes for tungsten-halogen lamps and other high temperature light sources, as well as sealed-beam incandescent headlights.

7 Claims, 2 Drawing Sheets

ULTRAVIOLET ABSORBING AND YELLOW LIGHT FILTERING GLASSES FOR LAMP ENVELOPES

This application claims benefit of Provisional No. 60/106,574, filed Nov. 2, 1998.

BACKGROUND OF THE INVENTION

1. Field of Invention

The present invention relates to a family of glasses that absorb ultraviolet (UV) radiation and filter out yellow light in the visible region of the spectrum.

2. Description of Related Art

It is well known that ultraviolet (UV) radiation not only has harmful effects on humans, but can also cause degradation and discoloration in such items as paints, fabrics, and plastics. UV radiation covers wavelengths ranging from 60 nm–380 nm. The sun is not the only light source that emits UV waves. Various types of artificial lighting, such as halogen lamps and especially discharge and arc lamps, may also emit UV radiation. Accordingly, there is an interest in minimizing UV radiation emitted by artificial light sources as well. This may be achieved, for example, by utilizing UV absorbing glass in the fabrication of lamp envelopes, reflectors and lenses.

Equally as important as the interest in minimizing UV radiation emitted by artificial light source is the interest in producing lighting devices having improved illumination and high color rendering. This interest is pursued especially zealously in the automotive industry where there is a push for vehicle headlight systems that can provide improved night visibility. One option is high-intensity discharge (HID) lamps which are usually found on luxury and high-end performance automobiles. Although, HID lamps offer improved brightness and night visibility, they are costly. Therefore, there exists an interest in providing less; expensive lamps with similar performance properties. One method of achieving this objective is to approximate the illumination properties of HID lamps in less expensive light sources, such as tungsten halogen lamps or incandescent lamps. This may be achieved by employing lamp envelopes or lenses made of glass which filters visible light, for example neodymium containing glass which raises the color temperature of halogen or incandescent light sources. This results in a light source having improved brightness which can provide higher contrast definition to the illuminated objects.

Neodymium containing glass is known in the glass industry, and has historically found employment in the aviation and navigation fields.[1] Neodymium, a rare-earth element, is most often incorporated in glass as an oxide, more specifically $Nd_2O_3$. Long known as a coloring agent, neodymium like the other rare-earth elements possesses an absorption spectra that extends over both the visible and invisible regions, transferring practically unchanged to base compounds, such as glasses.[2] Neodymium absorbs light in the yellow region of the visible spectrum, between 568 and 590 nm. As a result, light passing through neodymium containing glass accentuates the red and green tones in the surrounding environment.[3] Experiments have also shown that neodymium containing glass provides an increase in visibility during foggy weather.[4]

Recently, neodymium containing glass has been proposed for the production of automobile headlights to reduce the visual discomfort from oncoming cars (U.S. Pat. No. 5,548,491) and for reflective lamps to yield a high color rendering (U.S. Pat. No. 4,315,186). For example in U.S. Pat. No. 5,548,491, Karpen discloses a motor vehicle headlight, either an incandescent lamp or a tungsten-halogen lamp comprising glass bulbs produced from neodymium doped soda lime glass and borosilicate or quartz glass, respectively. Neodymium oxide in the range of 5–30% by weight is disclosed therein. Hirano et al. (U.S. Pat. No. 4,315,186) discloses a reflective incandescent display lamp with a front lens section fused to a reflective mirror section, the front lens section formed from a $Nd_2O_3$ glass (preferably borosilicate as the base glass), the $Nd_2O_3$ accounting for 0.5–5% by weight.

Another important rare-earth spectrum modifying element is cerium. One important use of cerium oxide incorporation in glasses is an increase in photo-darkening resistance when these glasses are exposed to ionizing radiation.[5] More important, cerium is the only rare-earth element that absorbs UV radiation while exhibiting no absorption in the visible region of the spectrum.[6] Therefore, cerium has value as a UV absorbing element when it is incorporated in a parent glass.

Traditionally, cerium has been used in combination with other rare-earth elements for decolorising glasses.[7] G. P. Drossbach patented a mixture of neodymium and cerium oxide for decolorization of glasses.[8] U.S. Pat. Nos. 3,865,747 (Greenberg) and 3,929,440 (Oldfield) disclose laser glasses containing neodymium and cerium. U.S. Pat. No. 3,685,747 (Greenberg) discloses that $CeO_2$ in the range of 0.01–20 wt. % is added to ensure that uranium, another element in the glass composition, remains in its most fully oxidized state during the melting process; $Nd_2O_3$ in the range of 0.01–30 wt. % is disclosed. U.S. Pat. No. 3,929,440 (Oldfield) discloses a lithium silicate laser glass containing neodymium and cerium; $CeO_2$ in the range of 0–0.1 wt. % is added as a solarization agent; $Nd_2O_3$ in the range of 2.5–6.5 wt. % is disclosed. U.S. Pat. Nos. 4,376,829 (Daiku), 4,390,637 (Daiku) and 4,521,524 (Yamashita) disclose glasses containing neodymium and cerium in combination for use in cathode ray tubes. U.S. Pat. No. 4,376,829 (Daiku) discloses a glass which absorbs in the yellow and blue regions of the spectrum for use in light-source cathode ray tubes; $Nd_2O_3$ in the range of 1–10 wt. % and $CeO_2$ in the range of 0.1–3 wt. % are disclosed. U.S. Pat. No. 4,390,637, (Daiku) discloses an X-ray absorbing and non-discoloring glass for use in color cathode ray tubes, said glass containing $Nd_2O_3$ in the range of 0.1–5 wt. % and $CeO_2$ in the range of 0–3 wt. %. U.S. Pat. No. 4,521,524 (Yamashita) discloses a glass filter for a CRT display, said glass containing $Nd_2O_3$ in the range of 5–40 wt. % and $CeO_2$ in the range of 0–6 wt. %; $CeO_2$ added as a coloring agent.

It would be highly desirable to marry the benefits provided by the characteristic absorption spectra of neodymium, i.e., absorption of light in the yellow region of the visible spectrum, and cerium, i.e., absorption of UV radiation with no visible light absorption, into a family of glasses that are suitable for employment: as lamp envelopes, more particularly envelopes for high-temperature lamp (i.e., tungsten-halogen lamps), as well as sealed beam incandescent headlight lamps, whereby light sources of this type would emit minimum UV radiation and provide improved illumination in the surrounding environment. It is the basic purpose of the present invention to provide this desirable combination.

REFERENCES

1. Weyl, Woldemar A; *Coloured Glasses*; Published by Society of Glass Technology, "Thorton", 20 Hallam Gate Road, Sheffield, S10 5BT, England, 1951; page 227.

2. Ibid., page 218.
3. Ibid., page 226.
4. Ibid., page 227.
5. S. Stroud, J. S., "Color Centers in a Cerium-Containing Silicate Glass", J. Chem. Phys., 37 No.4, pages 836–841, August 1962.
6. Weyl, Woldemar A; *Coloured Glasses*; Published by Society of Glass Technology, "Thorton", 20 Hallam Gate Road, Sheffield, S10 5BT, England, 1951; page 230.
7. Ibid., page 220, 229.
8. Ibid., page 229.

SUMMARY OF THE INVENTION

The present invention resides in a family of glasses that absorb UV radiation and filter yellow light in the visible region of the spectrum, the glass composition consisting essentially, in terms of weight percent on the oxide basis, of: 55–95.7% $SiO_2$, 0–28% $B_2O_3$, 0.5–18% $Al_2O_3$, 0–4% SrO, 0–13% BaO, 0–13% CaO, 0–8% MgO, 0–7.5% $Na_2O$, 0–9.5% $K_2O$, 0–1.5% $Li_2O$, 0–1.5% $Sb_2O_3$, 0.4–4.5% $Nd_2O_3$, and 0.1–1% $CeO_2$. The glasses of the present invention have a light transmission of greater than 70% throughout visible wavelengths other than yellow light.

Glasses of the present invention are capable of employment as lamp envelopes, more particularly envelopes for tungsten-halogen lamps and other high temperature light sources, as well as envelopes for sealed-beam incandescent headlight;.

The glasses of the present invention having a composition consisting essentially, in terms of weight percent on the oxide basis of: 90.5–95.7% $SiO_2$, 2.8–3.0% $B_2O_3$, 0.7–1.7% $Al_2O_3$, 0.4–4.5% $Nd_2O_3$, and 0.1–1% $CeO_2$ are suitable as envelopes for tungsten-halogen lamps and other high temperature lamps, as are glasses having a composition consisting essentially, in terms of weight percent on the oxide basis of: 55–66% $SiO_2$, 0–13% $B_2O_3$, 14–18% $Al_2O_3$, 0–13% BaO, 0–4 SrO, 0–13% CaO, 0–8% MgO, 0.4–4.5% $Nd_2O_3$, 0.1–1% $CeO_2$.

The glasses of the present invention having a composition consisting essentially, in terms of weight percent on the oxide basis of: 64–85% $SiO_2$, 11–28% $B_2O_3$, 0.5–8.5% $Al_2O_3$, 0–3.5% BaO, 0–1.5% CaO, 0–7.5% $Na_2O$, 0–9.5% $K_2O$, 0–1.5% $Li_2O$, 0–1.5% $Sb_2O_3$, 0.4–4.5% $Nd_2O_3$, and 0.1–1% $CeO_2$ are suitable as envelopes for sealed-beam incandescent headlights.

DETAILED DESCRIPTION OF THE PROFFERED EMBODIMENTS

Table I sets forth a group of glass compositions, reported in weight percent on the oxide basis, useful in understanding the present invention. The actual batch ingredients can comprise any materials, either the oxides or other compounds, which, when melted together, will be converted into the desired oxides in the proper proportions.

TABLE I

|  | 1 | 2 | 3 | 4 |
|---|---|---|---|---|
| $SiO_2$ | 96.5 | 94.8 | 94.8 | 90.5 |
| $B_2O_3$ | 3.0 | 2.95 | 2.93 | 2.8 |
| $Al_2O_3$ | 0.5 | 1.1 | 1.23 | 1.7 |
| BaO |  |  |  |  |
| SrO |  |  |  |  |
| CaO |  |  |  |  |
| MgO |  |  |  |  |
| $Na_2O$ |  |  |  |  |
| $K_2O$ |  |  |  |  |
| $Li_2O$ |  |  |  |  |
| $Sb_2O_3$ |  |  |  |  |
| $Nd_2O_3$ |  | 1.05 | 1.79 | 4.5 |
| $CeO_2$ |  | 0.12 | 0.55 | 1.0 |

As is apparent from Table I, glasses 1, 2, 3 and 4 are high in silica content. High silica glasses are marketed by Corning Incorporated under the trademark VYCOR®, and have their genesis in U.S. Pat. No. 2,106,744, herein incorporated by reference. Glass 1, which is provided as a referenced glass, contains no $Nd_2O_3$ or $CeO_2$. Glasses 2, 3, and 4 contain various amounts of $Nd_2O_3$ or $CeO_2$.

The method of preparation for glasses 2, 3, and 4 comprises the following general steps:

(1) melting a borosilicate glass in the usual manner, preferably in a tank furnace or in such manner as to produce the most homogenous melt possible;

(2) fabricating the parent borosilicate glass into a glass article having a desired shape, for example, a lamp envelope;

(3) heat treating the glass article at a temperature between about 500°–600° C. for a sufficient length of time to internally separate the glass into a silica-rich phase which is insoluble in acids and silica-poor or borate-rich phase which is soluble in acids;

(4) immersing the heat-treated glass article in an acid bath (usually mineral acid) to leach out the silica-poor or borate-rich phase, whereby there is produced a porous structure composed of the silica-rich phase consisting of a plurality of intercommunicating, submicroscopic pores throughout the article;

(5) rinsing and drying the porous article to remove the leachent residue;

(6) immersing the porous glass article into a bath of neodymium/cerium and aluminum-nitrate salt solution;

(7) rinsing and drying the impregnated porous glass article; and then, (8) heating the porous glass article at about 1200°–1300° C. to consolidate into a non-porous glass body containing neodymium and cerium ions incorporated in the glass structure.

It has been found that $Al^{3+}$ ion added to the neodymium/cerium-nitrate salt solution prevents crystallization of the glass during consolidation. To prevent crystallization at least a 1:1 molar ratio of Al-nitrate to total neodymium/cerium-nitrate salt is required.

Figure 1:
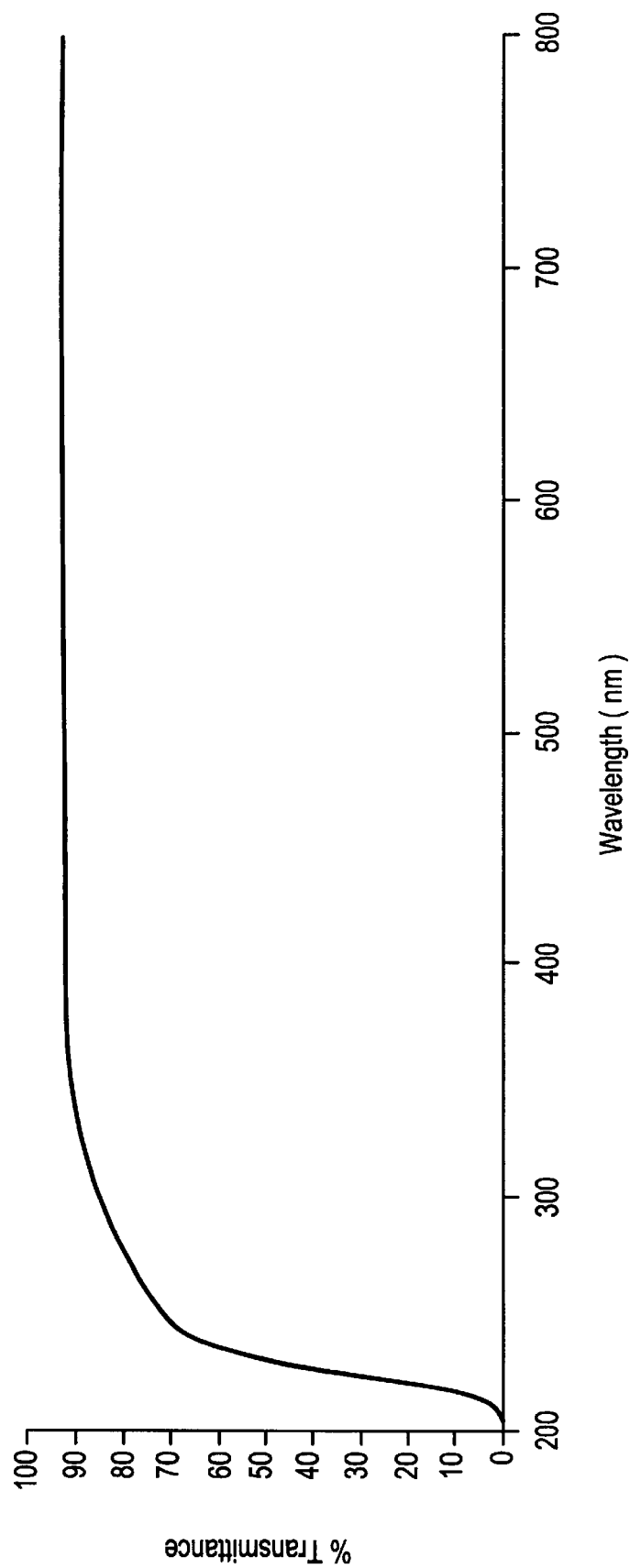
FIG. 1 is a graph illustrating the light transmission spectra of a glass of the present invention without neodymium and cerium additions.
Figure 2:
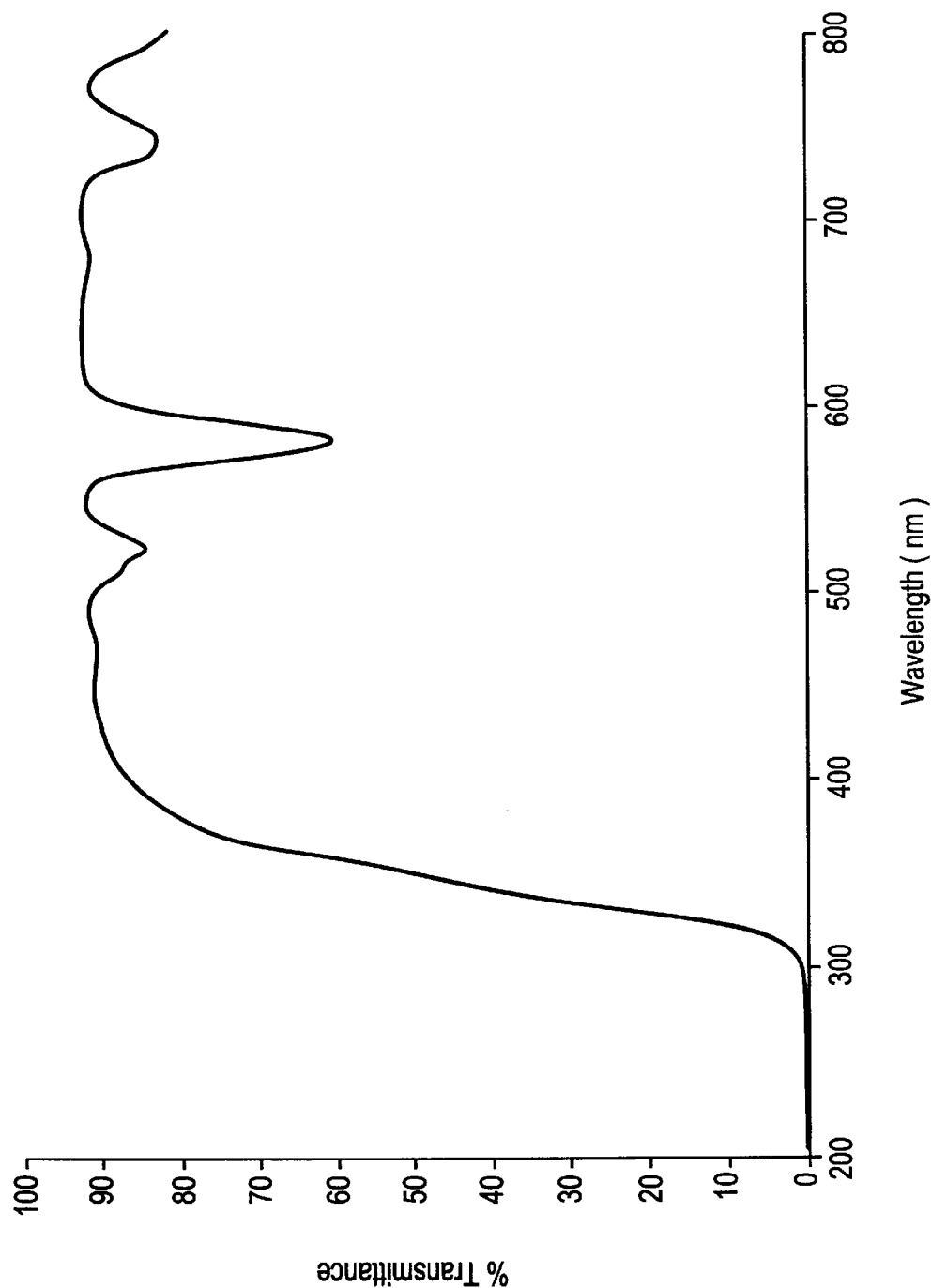
FIG. 2 is a graph illustrating the light transmission spectra of the glass of FIG. 1 having neodymium and cerium additions.

Referring now to FIGS. 1 and 2 therein illustrated are the light transmission spectra of glasses 1 and 2 of Table I. Glass 1 is a high silica glass, as disclosed in U.S. Pat. No. 2,106,744, without any $Nd_2O_3$ or $CeO_2$ additions. As it is illustrated in FIG. 1, glass 1 blocks UV radiation up to 220 nm. UV radiation ranges from 60 nm–380 nm. The glass of FIG. 1 also has a high transmission (avg. transmission >90%) throughout the visible region of the spectrum between 400 nm–700 nm, as well as into the near infrared spectral region, between 760–2500 nm.

FIG. 2 shows the light transmission spectra of the glass 2 in Table I. Glass 2 is also a high silica glass comparable to glass 1, and contains 1.05% $Nd_2O_3$ and 0.12% $CeO_2$. As it is illustrated in FIG. 2, a high silica glass containing neodymium and cerium blocks UV radiation up to about 320 nm, further absorbing UV radiation to about 380 nm, while filtering yellow light at about 585 nm.

It is known that temperatures in localized areas of tungsten-halogen lamp envelopes may range up to 700° C., and therefore glasses suitable for such envelopes must be thermally stable (resist devitrification) and withstand thermal deformation at those temperatures. Glasses of the kind typified in the compositional range of glasses 2, 3 and 4 exhibit annealing points in the vicinity of 1000° C., and are essentially unaffected by the temperatures encountered during operation of the lamps, and therefore are suitable for employment in the manufacturing of envelopes for tungsten-halogen lamps and other high temperature lighting devices.

A tungsten-halogen lamp system consisting of a lamp envelope comprising the glasses herein above described provides an alternative lower cost lamp system having substantially the same benefits of an HID lamp, more specifically improved visibility and contrast performance.

Another advantage in the lamp system described herein above is that UV radiation is largely filtered from the light source. Therefore, for example, in commercial facilities degradation to light masking artifices from prolonged exposure to UV radiation will be reduced to a minimum.

Glass examples 5 and 6 illustrate aluminosilicate versions of the present inventive compositions.

Glasses 7 and 8 represent two examples of borosilicate compositions. Borosilicate glasses of the kind typified may be used as lamp envelopes or sleeves for sealed-beam incandescent headlamps and interior/display-parabolic aluminized reflectors.

Although the now preferred embodiments of the invention have been set forth, it will be apparent to those skilled in the art that various changes and modifications may be made thereto without departing from the spirit and scope of the invention as set forth in the following claims.

What is claimed is:

1. A glass having a composition, in terms of weight percent on an oxide basis, consisting essentially of: 55–95.7% $SiO_2$, 0–28% $B_2O_3$, 0.5–18% $Al_2O_3$, 0–4% SrO, 0–13% BaO, 0–13% CaO, 0–8% MgO, 0–7.5% $Na_2O$, 0–9.5% $K_2O$, 0–1.5% $Li_2O$, 0–1.5% $Sb_2O_3$, 0.4–4.5% $Nd_2O_3$, and 0.1–1% $CeO_2$, wherein said glass absorbs ultraviolet radiation and filters yellow light in visible wavelengths, and has a light transmission of greater than 70 percent throughout other visible wavelengths.

2. The glass according to claim 1, wherein said glass filters yellow light at 585 nm, blocks ultraviolet radiation up to 320 nm, and further absorbs ultraviolet radiation up to 380 nm, and has a light transmission of about 80–90 percent throughout other visible wavelengths.

3. The glass according to claim 1, wherein said glass has a composition, in terms of weight percent on an oxide basis, consisting essentially of: 90.5–95.7% $SiO_2$, 0–3.0% $B_2O_3$, 0.5–7.0% $Al_2O_3$, 0.4–4.5% $Nd_2O_3$, and 0.1–1% $CeO_2$.

4. The glass according to claim 1, wherein said glass has a composition, in terms of weight percent on an oxide basis, consisting essentially of: 55–66% $SiO_2$, 0–13% $B_2O_3$, 14–18% $Al_2O_3$, 0–13% BaO, 0–4% SrO, 0–13% CaO, 0–8% MgO, 0.4–4.5% $Nd_2O_3$, and 0.1–1% $CeO_2$.

5. The glass according to claim 1, wherein said glass has a composition, in terms of weight percent on an oxide basis, consisting essentially of: 64–85% $SiO_2$, 11–28% $B_2O_3$, 0.5–8.5% $Al_2O_3$, 0–3.5% BaO, 0–1.5% CaO, 0–7.5% $Na_2O$, 0–9.5% $K_2O$, 0–1.5% $Li_2O$, 0–1.5% $Sb_2O_3$, 0.4–4.5% $Nd_2O_3$, and 0.1–1% $CeO_2$.

6. The glass according to claim 5, wherein said glass is suitable for use as a lamp envelop for sealed-beam incandescent headlamps.

7. An article of manufacture comprising a glass having a composition, in terms of weight percent on an oxide basis, consisting essentially of: 55–95.7% $SiO_2$, 0–28% $B_2O_3$, 0.5–18% $Al_2O_3$, 0–4% SrO, 0–13% BaO, 0–13% CaO, 0–8% MgO, 0–7.5% $Na_2O$, 0–9.5% $K_2O$, 0–1.5% $Li_2O$, 0–1.5% $Sb_2O_3$, 0.4–4.5% $Nd_2O_3$, and 0.1–1% $CeO_2$, wherein said glass absorbs ultraviolet radiation and filters yellow light in visible wavelengths, and has a light transmission of greater than 70 percent throughout other visible wavelengths.

* * * * *